United States Patent
Heemstra et al.

(10) Patent No.: US 6,313,957 B1
(45) Date of Patent: Nov. 6, 2001

(54) LASER ILLUMINATION ARRANGEMENT FOR A CATHODE RAY TUBE

(75) Inventors: Tewe Hiepke Heemstra; Geert Jan Van Der Meer, both of Eindhoven (NL)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/431,893

(22) Filed: Nov. 2, 1999

(30) Foreign Application Priority Data

Nov. 2, 1998 (EP) .................................................. 98203690

(51) Int. Cl.[7] ............................. G02B 9/08; G02B 27/10; G02B 27/12; G03C 5/00
(52) U.S. Cl. ............................. 359/738; 619/639; 430/24
(58) Field of Search ...................................... 359/688, 671, 359/719, 599, 619, 639, 738; 430/24, 26

(56) References Cited

U.S. PATENT DOCUMENTS

| 4,117,177 | | 9/1978 | Schlafer | 427/53 |
| 5,822,130 | * | 10/1998 | Nagano et al. | 359/688 |
| 6,005,722 | * | 12/1999 | Butterworth et al. | 359/712 |
| 6,016,227 | * | 1/2000 | Hopkins et al. | 359/688 |

FOREIGN PATENT DOCUMENTS 0731485   11/1996   (EP) .............................. H01J/9/227

* cited by examiner

Primary Examiner—Georgia Epps
Assistant Examiner—David N. Spector

(57) ABSTRACT

A photosensitive layer of or for a cathode ray tube is illuminated by means of a laser illumination arrangement. The laser illumination arrangement comprises a homogenizer which serves to reduce the coherence of the laser beam.

6 Claims, 5 Drawing Sheets

LASER ILLUMINATION ARRANGEMENT FOR A CATHODE RAY TUBE

BACKGROUND OF THE INVENTION

The invention relates to a laser illumination arrangement for illuminating a photosensitive layer in the course of the manufacture of a cathode ray tube, said laser illumination arrangement comprising a laser and an optical imaging arrangement for imaging laser light onto the photosensitive layer which is applied to a display window of or for a cathode ray tube.

Such illumination arrangements can be used to manufacture a cathode ray tube, inter alia, for creating phosphor patterns and black matrix patterns on a display window of a cathode ray tube.

An illumination arrangement of the type mentioned in the opening paragraph is disclosed in U.S. Pat. No. 4,117,177. In this patent specification, a description is given of an arrangement in which a photosensitive layer is illuminated by means of a laser beam. The photosensitive layer is applied to a surface of a display window of or for a cathode ray tube. Illumination takes place by imaging laser light onto and scanning it across the photosensitive layer. A shadow mask comprising a large number of openings is situated between the illumination arrangement and the photosensitive layer. The laser light is directed through the openings in the shadow mask at such an angle that a pattern is formed behind the shadow mask. This process is repeated a number of times, at a number of different angles, thereby creating a number of patterns. In this manner, phosphor patterns and/or black matrix patterns can be provided.

Although the use of a laser for illuminating the photosensitive layer offers a number of advantages, it has been found in practice that by using the above-described method, the illumination pattern is subject to variations, leading to an increase of the number of rejects (=the number/percentage of illuminated photosensitive layers which do not meet the quality requirements imposed and hence must be removed from the production process).

OBJECTS AND SUMMARY OF THE INVENTION

It is an object of the invention to provide an improved illumination arrangement of the type mentioned in the opening paragraph.

To achieve this, a laser illumination arrangement in accordance with the invention is characterized in that the arrangement comprises a beam homogenizer between the laser and the optical imaging arrangement or as a part of the optical imaging arrangement.

A beam homogenizer reduces the coherence of a laser beam incident on the beam homogenizer.

A laser beam is a concentrated coherent beam of light. In practice it has been found that undesirable interference patterns and reflection patterns occur. The beam of coherent laser light interferes with itself, thereby causing interference patterns. Also scattering at, for example, dust particles in the air or on an optical element, such as a lens or a mirror, occurs. These interference patterns and scattering patterns cannot be predicted. Outside and superposed on the actual beam, the patterns form a kind of fleck pattern. As a result, light of a deviating intensity, i.e. of an intensity other than the desired intensity, is incident on the photosensitive layer at locations where this is undesirable. This leads to rejects. In the laser illumination arrangement in accordance with the invention, the laser beam is controlled by a beam homogenizer. In said beam homogenizer, the coherent laser beam which is incident on the beam homogenizer is converted to a much less coherent beam. In fact, a plurality of sub-laser beams are formed in the beam integrator, which jointly form a broad beam. Since the coherence is reduced substantially, or preferably has disappeared, interference patterns of the laser beam at itself occur to a much smaller degree. Reflection at dust particles may still occur, but since the beam has generally become broader, the intensity of reflected light will be smaller, and more importantly, since the coherence of the laser beam is reduced, the reflected light will generally be spread over a much larger space angle (and will thus be much less concentrated). The maximum intensity deviation which can occur at a spot of the photosensitive layer as a result of reflection at dust or other particles has been reduced by orders of magnitude.

Unlike the known state of the art, the laser beam is preferably not scanned across the photosensitive layer, but instead, the laser illumination arrangement comprises a wide-angle objective for imaging the laser beam onto the photosensitive layer. This has the advantage that moving parts are not necessary. Moving parts cause vibrations which may disturb the image or the setting of the laser illumination arrangement. In addition, moving parts are susceptible to failure and require relatively much maintenance work.

The use of a wide-angle objective enables a virtual light source to be created. Preferably the arrangement is such that the size of the virtual light source ranges between 1 and 2.5 mm. If the light source is smaller than 1 mm, the intensity of the light exhibits pronounced ripples behind an opening in the shadow mask, which is undesirable. If the size exceeds 2.5 mm, the intensity becomes lower. Preferably, the size exceeds 1.5 mm.

Preferably, the beam homogenizer is formed such that the shape of the beam issuing from the beam homogenizer is substantially identical to that of the photosensitive layer of or for a cathode ray tube. For this reason, for illuminating a 4×3 display screen, use is made of a laser beam (after having been guided through the beam homogenizer) with a length/width ratio of approximately 4×3; for a 16×9 display screen, use is made of a laser beam having a length/width ratio of 16×9 etc. By virtue thereof, the illumination efficiency (the amount of light used) can be increased.

These and other aspects of the invention will be apparent from and elucidated with reference to the embodiment(s) described hereinafter.

BRIEF DESCRIPTION OF THE DRAWINGS

In the drawings.

The Figures are diagrammatic and not drawn to scale. In the Figures, like reference numerals generally refer to like parts.

DESCRIPTION OF THE PREFERRED EMBODIMENTS

Figure 1:
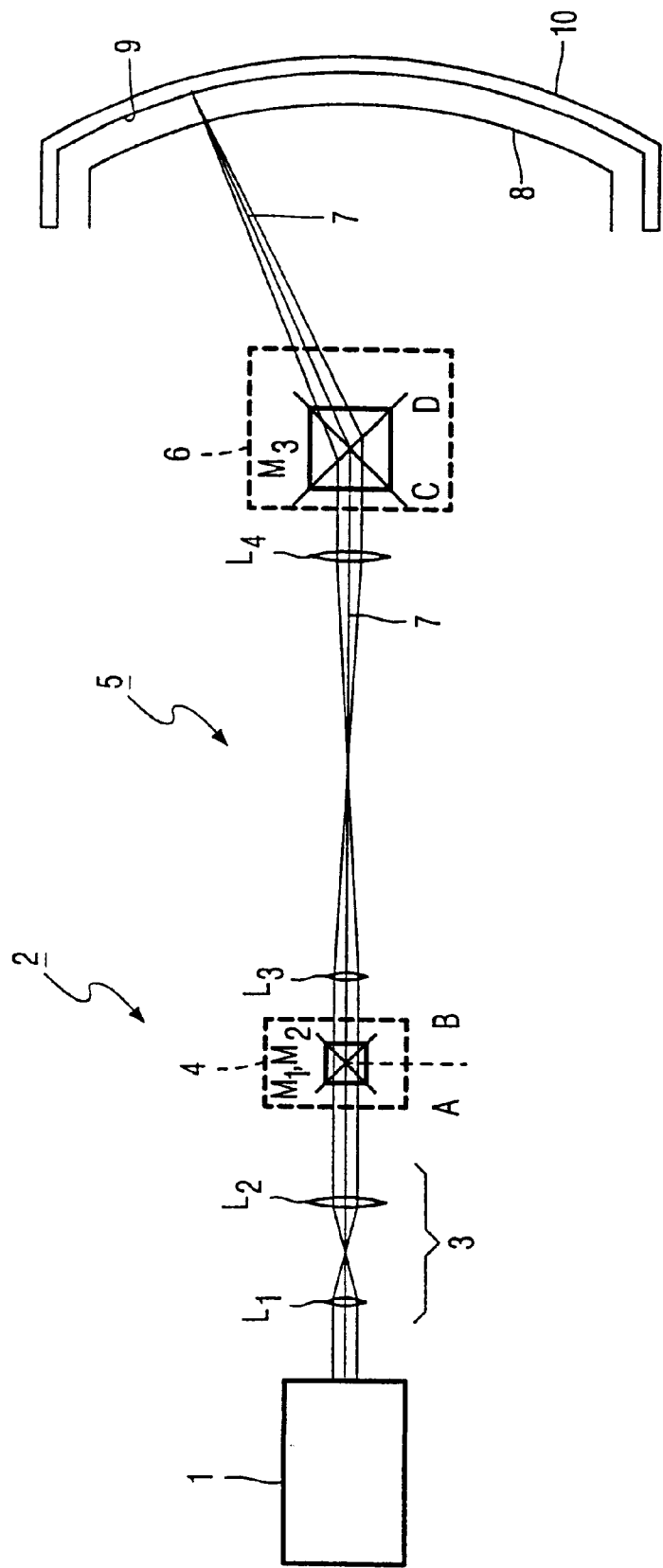
FIG. 1 schematically shows a laser illumination arrangement in accordance with the prior-art arrangement.

FIG. 1 is a schematic and simplified view of a laser illumination arrangement as shown in U.S. Pat. No. 4,177,177. The laser illumination arrangement comprises a laser 1 and an arrangement 2. The arrangement 2 includes a first set 3 with lenses L1 and L2, a scanning portion 4 with a set of movable mirrors M1 and M2 which can be rotated about axes M1 and M2, a second set 5 with lenses L3 and L4, and a further scanning portion 6 with a movable mirror M3 which can be moved about the axes C and D. The sets of lenses cause the beam diameter to be enlarged and the beam 7 to be imaged onto a photosensitive layer 9 on display window 10. A shadow mask 8 is situated in front of the photosensitive layer. The scanning portions deflect the beam and scan the photosensitive layer.

Figure 2:
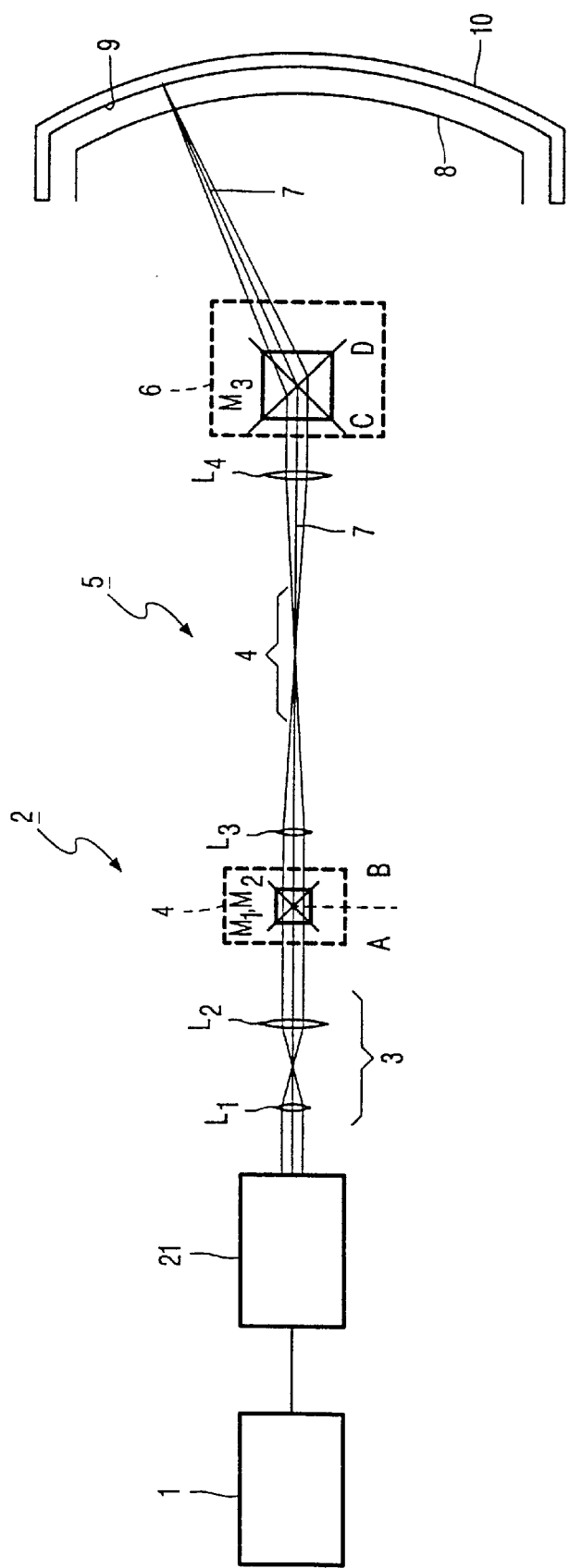
FIG. 2 schematically shows an example of a laser illumination arrangement in accordance with the invention.

FIG. 2 is a schematic, simplified view of a laser illumination arrangement in accordance with the invention. In this example, the photosensitive layer is scanned. A beam homogenizer is arranged between the laser 1 and the lens L1. In this beam integrator, the diameter of the laser beam incident on an entrance plane is increased and the laser beam is homogenized, that is to say that the intensity of the laser light emerging from the exit plane is approximately equal throughout the surface of the exit window, and that the coherence of the emergent light exhibits a reduction, or has disappeared. In this example, the beam homogenizer is arranged between the laser and the lens L1. This is not to be interpreted in a limiting sense. The beam homogenizer may, for example, also be arranged between the lens L2 and the mirror M1.

Figure 3:
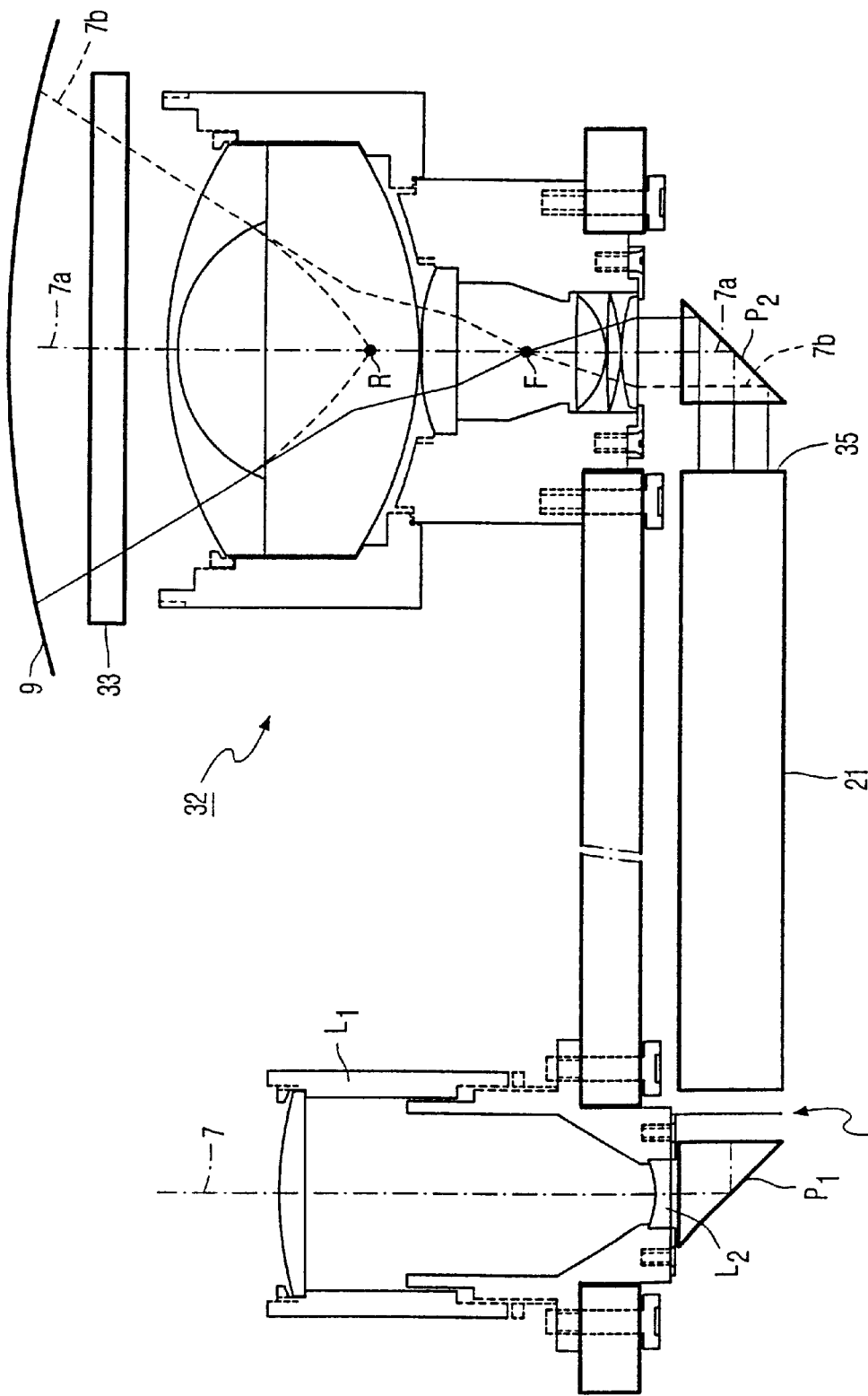
FIG. 3 schematically shows another example of a laser illumination arrangement in accordance with the invention.

FIG. 3 shows a further example of a laser illumination arrangement in accordance with the invention. A laser beam 7 generated by the laser 1 (laser 1 is not shown in FIG. 3) passes a telescope lens system L1, L2. Subsequently, the direction of the laser beam 7 is changed 90 degrees by prism P1, the beam is homogenized in the beam homogenizer 21, the beam direction is changed 90 degrees by prism P2 and the beam imaged is onto a photosensitive layer 9 on the display window by a wide-angle objective 32. The beam homogenizer may include, for example, an elongated (having a length of, for example, 25 to 50 cm) quartz rod. As a result of internal reflections at the side walls of the rod, the coherence of the entering laser beam 7 is reduced, and preferably disappears. Two sub-beams 7a and 7b of the laser beam are shown as well as their beam paths through the wide-angle objective 32. It seems that all sub-beams originate from a virtual source (VP) in the wide-angle objective. The (virtual) size of the virtual source is a parameter which may be important, as will be explained hereinbelow. In this example, the arrangement further includes a Fresnel lens 33 having a large number of facets. This lens causes the imaging of the laser beam to be improved, in particular the angle at which the laser beam is incident on the photosensitive layer. During illumination, the Fresnel lens may perform a small movement to preclude that the transitions between the facets are visible on the photosensitive layer. In front of the entrance side of the rod 21 there is arranged, in a preferred embodiment, a diffuser 34. By means of a diffuser the laser beam is allowed to pass in a diffused manner and the angle of dispersion of the laser beam is increased. As a result, more reflections occur at the side walls of the rod, the coherence of the laser beam is further reduced and the homogeneity of the laser beam (in terms of intensity) across the exit window 35 is increased. Preferably, the exit window is imaged onto the photosensitive layer 9 so as to be slightly out of focus. In the case of sharp focusing, a dust particle on the exit window may cause an undesirable reduction in intensity on the photosensitive layer. By imaging out of focus, this problem is reduced substantially.

Figure 4:
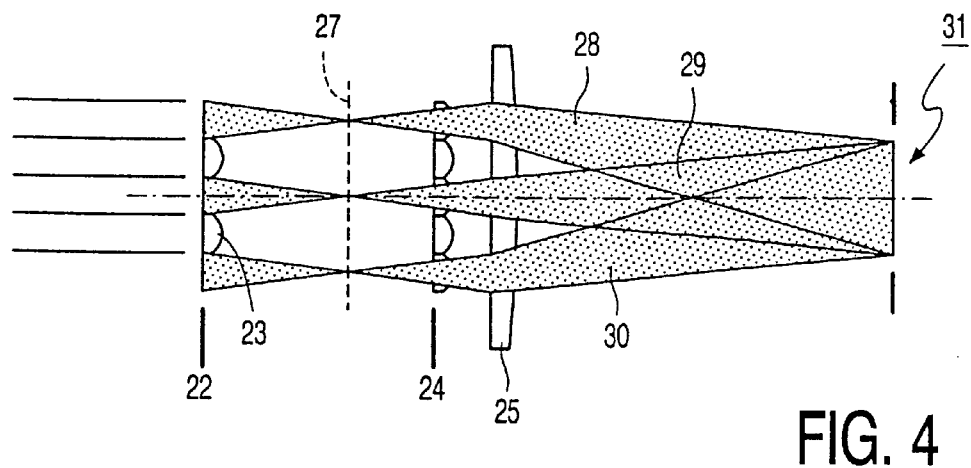
FIG. 4 is a schematic, sectional view of a beam homogenizer, in this example a beam integrator.

FIG. 4 is a schematic, sectional view of a further example of a beam homogenizer. This type of beam homogenizer may be used as an alternative to the rod shown in FIG. 3. In this example, the beam homogenizer comprises an entrance side 22 having a large number (for example 32 (4×8)) lenses 23. These lenses form a number of sub-beams which are focused in a plane 27. This plane is imaged in the F-point (see FIG. 3). Said entrance side further includes a large number of lenses 24 and a lens 25. The laser beam incident on the lenses 23 is divided into a number of sub-beams, three of which (28, 29 and 30) are shown in FIG. 4. Small path-length differences occur between the sub-beams. Therefore, the emergent beam, all sub-beams of which converge in plane 31, is composed of a large number of sub-beams. This results in a reduction of the coherence of the light. The plane 31 is imaged onto the photosensitive layer 9 (see FIG. 3). In this manner, the coherence of the light is reduced. The plane 31 is imaged onto the photosensitive layer 9 (see FIG. 3). In this example, this plane may be imaged so as to be sharply focused because it is not formed by a fixed surface (as in the case of the rod shown in FIG. 3).

Figure 5:
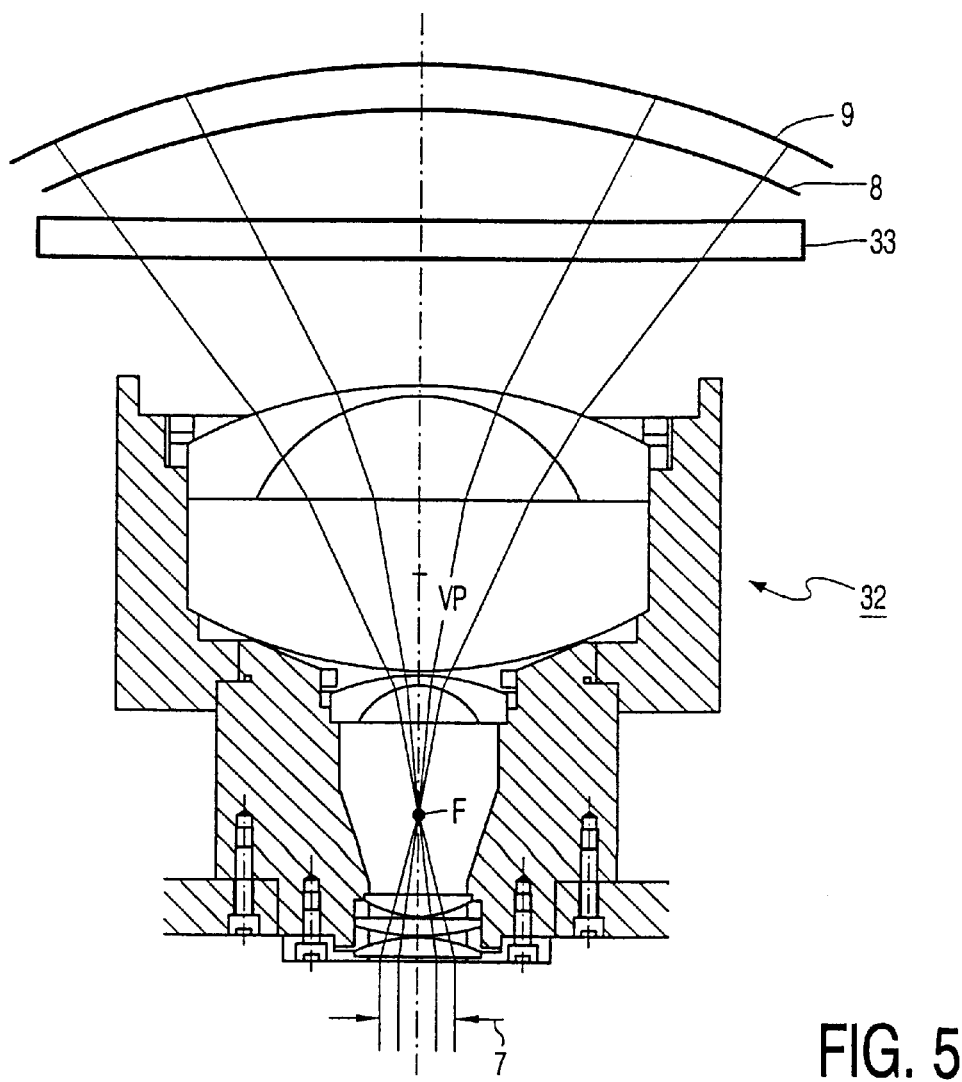
FIG. 5 schematically shows a wide-angle objective which can suitably be used in a laser illumination arrangement in accordance with the invention.

FIG. 5 is a schematic, sectional view of a wide-angle objective 32. The laser beam is imaged by the wide-angle objective 32 onto the photosensitive layer 9 via openings in the shadow mask 8. All light beams seem to originate from a virtual source VP. Therefore, in this arrangement the photosensitive layer is illuminated and exposed in a single run. Unlike the known arrangement, the laser beam is not scanned across the photosensitive layer. The advantage of the use of a wide-angle objective relative to an arrangement as shown in FIG. 1 in which the laser beam is scanned across the photosensitive layer, is that no moving parts are required. Moving parts cause vibrations which may adversely affect the illumination and/or the arrangement. Besides, scanning may cause so-called stitching problems. The laser beam is scanned across the photosensitive layer in a number of zones. Problems may arise at locations where the zones demonstrate an overlap. If the parts to be illuminated do not demonstrate an overlap, then a portion of the photosensitive layer cannot be illuminated, however, if they do demonstrate an overlap then a portion of the photosensitive layer is illuminated twice. In either case, problems may occur. Non-illuminated parts are useless, while twice-illuminated parts have received too much light. In the arrangement shown in FIG. 3, these problems do not occur because the photosensitive layer is integrally illuminated by one laser beam. It is noted that if the above-mentioned problems (interference phenomena) do constitute a problem in an arrangement wherein the laser beam is scanned, these problems are greater if scanning does not take place. The problems caused by said interference patterns are slightly reduced by scanning if a laser beam is scanned. Unexpected and undesirable differences in intensity are distributed over a large surface area by the movement of the beam, so that the effect thereof is smaller. This "smoothing" effect does not occur in an illumination arrangement in which the laser beam is stationary.

As mentioned hereinabove, the dimension of the virtual source VP is important if illumination takes place via a shadow mask.

Figure 6:
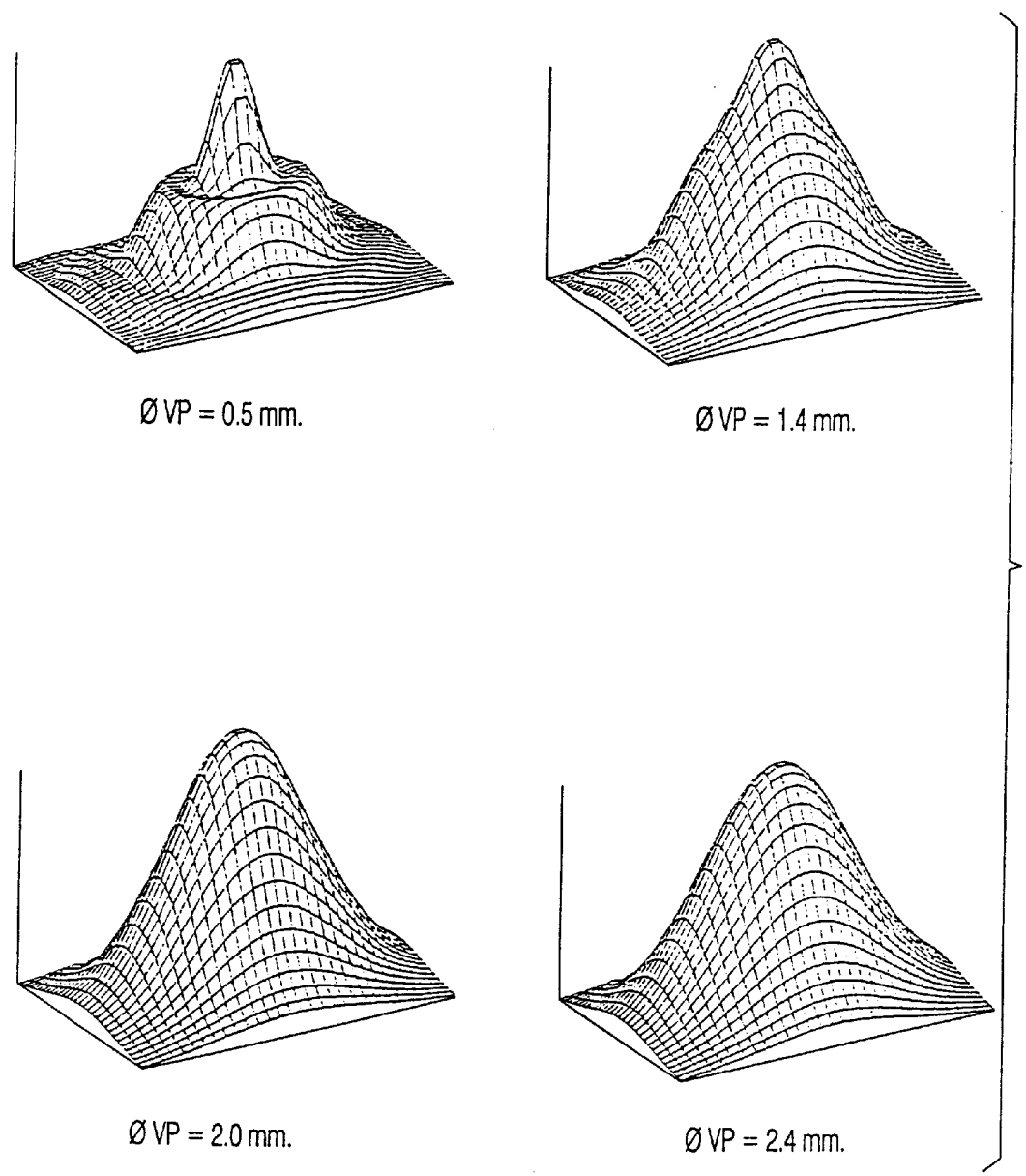
FIG. 6 graphically shows the connection between the size of the virtual source and the shape of the intensity of the light behind a shadow mask.

FIG. 6 shows the intensity distribution on the photosensitive layer behind an opening in the shadow mask as a function of the diameter of the virtual source VP ($\Phi$VP). At a diameter of 0.5 mm, the intensity clearly exhibits a peak. This is undesirable. This peak disappears as the diameter of the virtual source increases. This increase of the diameter causes the maximum intensity to decrease. For this reason, preferably, the dimension of the virtual source (that is the diameter in one direction) ranges between 1 and 2.5 mm.

Hereinabove, the invention has been described and illustrated by means of a laser illumination arrangement. Hereinbelow, a description will be given of the method in accordance with the invention:

In the manufacture of a cathode ray tube, in which, in a process step, a photosensitive layer on a display window of or for a cathode ray tube is illuminated by light from a laser beam, the laser beam is guided, before reaching the photosensitive layer, through a beam homogenizer. As a result, the occurrence of disturbing interference patterns is reduced, or prevented. Preferably, the laser beam is further guided through a wide-angle objective, so that the laser beam is spread over the photosensitive layer. Further preferred embodiments of the invention in accordance with the invention are formed, inter alia, in that the laser light is guided through a diffuser.

It will be obvious that, within the scope of the invention, many variations are possible.

What is claimed is:

1. A laser illumination arrangement for illuminating a photosensitive layer in the course of the manufacture of a cathode ray tube, said laser illumination arrangement comprising a laser and an optical imaging arrangement for imaging laser light onto the photosensitive layer which is applied to a display window of or for a cathode ray tube, characterized in that the laser illumination arrangement comprises a beam homogenizer between the laser and the optical imaging arrangement or as a part of the optical imaging arrangement.

2. A laser illumination arrangement as claimed in claim 1, characterized in that the beam homogenizer is formed such that the laser beam emerging from the beam homogenizer is rectangular in shape.

3. A laser illumination arrangement as claimed in claim 1, characterized in that the laser illumination arrangement includes a wide-angle objective for focusing light emerging from the beam homogenizer.

4. A laser illumination arrangement as claimed in claim 3, characterized in that the laser illumination arrangement is such that it seems that, viewed from the photosensitive layer, the laser beam originating from the wide-angle objective comes from a virtual source, which virtual source has a dimension, in one direction, ranging between 1 and 2.5 mm.

5. A laser illumination arrangement as claimed in claim 1, characterized in that the laser illumination arrangement comprises means for scanning the photosensitive layer with the laser beam.

6. A laser illumination arrangement as claimed in claim 1, characterized in that the laser illumination arrangement comprises a diffuser arranged in front of the beam homogenizer.

* * * * *